(12) United States Patent
Lerch et al.

(10) Patent No.: US 11,094,085 B2
(45) Date of Patent: Aug. 17, 2021

(54) SYSTEM COMPRISING A COLOR SELECTION AID AND A METHOD FOR DETERMINING TOOTH COLORS

(71) Applicant: Ivoclar Vivadent AG, Schaan (LI)

(72) Inventors: Stefan Lerch, Bern (CH); Manuel Schlegel, Mels (CH)

(73) Assignee: Ivoclar Vivadent AG, Schaan (LI)

( * ) Notice: Subject to any disclaimer, the term of this patent is extended or adjusted under 35 U.S.C. 154(b) by 87 days.

(21) Appl. No.: 16/537,689

(22) Filed: Aug. 12, 2019

(65) Prior Publication Data

US 2020/0065997 A1    Feb. 27, 2020

(30) Foreign Application Priority Data

Aug. 23, 2018  (EP) .................. 18190543.1
Aug. 23, 2018  (EP) .................. 18190558.9

(51) Int. Cl.
| | | |
|---|---|---|
| *G06T 7/90* | (2017.01) | |
| *G06T 7/00* | (2017.01) | |
| *G01J 3/50* | (2006.01) | |
| *A61C 19/10* | (2006.01) | |
| *G01J 3/46* | (2006.01) | |
| *G06T 11/00* | (2006.01) | |

(52) U.S. Cl.
CPC ............... *G06T 7/90* (2017.01); *A61C 19/10* (2013.01); *G01J 3/508* (2013.01); *G06T 7/0014* (2013.01); *G01J 3/463* (2013.01); *G06T 11/001* (2013.01); *G06T 2207/10024* (2013.01); *G06T 2207/30036* (2013.01)

(58) Field of Classification Search
CPC ........ A61C 19/10; G01J 3/0272; G01J 3/508; G01J 3/0262; G01J 3/52; G01J 3/463; G06T 7/0014; G06T 7/90; G06T 2207/30036; G06T 2207/10024; G06T 11/001
See application file for complete search history.

(56) References Cited

U.S. PATENT DOCUMENTS

| | | |
|---|---|---|
| 4,541,801 A | 9/1985 | Mackert et al. |
| 5,177,694 A | 1/1993 | Graham et al. |
| 6,007,332 A | 12/1999 | O'Brien |

(Continued)

FOREIGN PATENT DOCUMENTS

| | | |
|---|---|---|
| WO | 2012038474 A1 | 3/2012 |
| WO | 2017046829 A1 | 3/2017 |

*Primary Examiner* — Brenda C Bernardi
(74) *Attorney, Agent, or Firm* — Ann M. Knab; Thad McMurray

(57) ABSTRACT

A system having an auxiliary color selection body and a method for determining the colors of a dental object, i.e. the colors of tooth, residual limb or gingiva, is provided, wherein the auxiliary color selection body (10) has a substantially U-shaped or L-shaped or ring-shaped structure, on which at least one, preferably 4, reference features (18), for recognition of the auxiliary color selection body (10) is/are attached, and wherein, with respect to the reference features (18), a plurality of tooth, stump or gingiva color fields (30) are arranged on the color selection auxiliary body (10). It is provided for an image of a tooth (16) to be taken with the auxiliary color selection body (10) being adjacent thereto on at least two sides and the tooth color is determined based on this image (FIG. 1).

20 Claims, 3 Drawing Sheets

(56) References Cited

U.S. PATENT DOCUMENTS

| | | |
|---|---|---|
| 6,206,691 B1 * | 3/2001 | Lehmann ............... A61C 19/00 |
| | | 356/408 |
| 6,210,159 B1 | 4/2001 | Lehmann et al. |
| 6,345,984 B2 | 2/2002 | Knab |
| 6,755,646 B2 | 6/2004 | Zun |
| 7,006,126 B2 | 2/2006 | Kerschbaumer et al. |
| 7,717,708 B2 | 5/2010 | Sachdeva et al. |
| 9,775,491 B2 | 10/2017 | Clausen et al. |
| 9,931,188 B2 | 4/2018 | Rohner et al. |
| 10,076,388 B2 | 9/2018 | Saliger |
| 2003/0235799 A1 | 12/2003 | Cruz |
| 2004/0252303 A1 * | 12/2004 | Giorgianni ............. G01J 3/508 |
| | | 356/402 |
| 2005/0083526 A1 * | 4/2005 | Jung .................... G01J 3/0291 |
| | | 356/402 |
| 2005/0123180 A1 * | 6/2005 | Luo ........................ G01J 3/508 |
| | | 382/128 |
| 2006/0177792 A1 | 8/2006 | Touchstone |
| 2009/0133260 A1 * | 5/2009 | Durbin ................ A61C 13/082 |
| | | 29/896.11 |
| 2009/0246727 A1 | 10/2009 | Vanini et al. |
| 2010/0304323 A1 | 12/2010 | Rohner et al. |
| 2011/0212420 A1 | 9/2011 | Vuillemot |
| 2013/0060532 A1 | 3/2013 | Clausen et al. |
| 2013/0158958 A1 | 6/2013 | Methot |
| 2013/0243310 A1 | 9/2013 | Jung et al. |
| 2016/0262860 A1 * | 9/2016 | Korten ................... G16H 20/40 |
| 2017/0319293 A1 | 11/2017 | Fisker |

* cited by examiner

SYSTEM COMPRISING A COLOR SELECTION AID AND A METHOD FOR DETERMINING TOOTH COLORS

CROSS-REFERENCE TO RELATED APPLICATIONS

This application claims priority to European Patent Application No. 18190543.1 filed on Aug. 23, 2018, the disclosure of which is incorporated herein by reference in its entirety. This application also claims priority to European Patent Application No. 18190558.9 filed on Aug. 23, 2018, the disclosure of which is incorporated herein by reference in its entirety.

TECHNICAL FIELD

The invention relates to a system consisting of a color selection aid and a method for determining colors of a dental object.

BACKGROUND OF THE INVENTION

Dental objects include teeth, but also tooth stumps, gingivae and dental restorations.

Color guides have been known for a long time, for example from DE 195 09 830 A1 and corresponding U.S. Pat. No. 5,653,589, which is hereby incorporated by reference in its entirety. Such a shade guide serves to ensure the best possible shade selection of a replacement tooth for the patient.

Such a replacement tooth, for example, is surrounded by two healthy teeth or has a healthy neighboring tooth. The aim is to adapt the color of the denture to the surroundings so that the dental restoration is as inconspicuous as possible.

In the practice, the shade guide is held close to the healthy teeth, using different shade selection areas on a trial basis, until the shade selection area which is closest in color and shade to the neighboring tooth is determined.

A problem with this resides in that teeth typically show a color gradient. The similarity is evaluated differently, depending onto which place the dentist holds the tooth shade guide including the respective shade selection area.

In this respect, improvement is made concerning the solution according to EP 2 255 749 A1 and corresponding US 2010304323, which is hereby incorporated by reference in its entirety. With this solution, the color selection areas are significantly smaller than with conventional tooth guides, so that each color selection area only comprises fraction of the dimensions of a tooth. Further dental color key and dental shade technology is set forth in U.S. Pat. Nos. 9,931,188, 4,541,801, 5,177,694, 6,007,332, 6,755,646, 7,006,126, US 20030235799, US 20040252303, and US 20090246727, which are all hereby incorporated by reference in their entirety.

This solution of a very small color key has the advantage that several color selection areas can be held next to the healthy tooth for the purposes of comparison in order to be able to perform better shade comparison.

Such small color selection areas, on the one hand, are hardly visible and on the other hand are more susceptible to soiling.

For example, if saliva gets in contact with the shade guide, that part of the shade guide will reflect stronger, giving a significantly different optical impression.

Experiments with different test persons using the known shade guides including color selection aids, revealed that the test persons assumes a color match and a color similarity very differently if they use the known shade guides in the conventional way.

SUMMARY OF THE INVENTION

In contrast, the invention is to provide a system of a color selection aid and a method for determining colors of a dental object and a method which is improved in terms of assessment consistency of a color comparison result.

This problem is solved by the claims and advantageous embodiments result from the subclaims.

The invention provides for a system consisting of a color selection aid and a method for determining dental colors. The auxiliary color selection body preferably has an essentially U-shaped or L-shaped or ring-shaped structure.

It is provided for the auxiliary color selection body to be photographed together with a natural or artificial tooth or any other dental object and to evaluate the photo thus produced. To accomplish this, the auxiliary color selection body is arranged in close proximity to the dental object.

For this, the auxiliary color selection body has at least one reference feature, and preferably has even four reference features. Reference features can range from 1, 2, 3, 4, or more. The reference features are used for referencing in the acquired image, i.e., for spatial assignment to the other acquired components of the image. Reference features may be any shape, size and color, such as but not limited to, circle, square, polygonal, rectangular and the like, suitable for positioning on the auxiliary color selection body.

On the auxiliary color selection body, there is also arranged a plurality or also a multiplicity of color fields. They correspond to color fields of dental objects such as teeth, stumps or gingivae in their colors, known and used in the field of dentistry.

Depending on the illumination situation during image acquisition, a brightness gradient may exist over the extension of the acquired image. In order to compensate for this, the brightness curve is corrected at any time until color recognition is completed, but preferably immediately following image acquisition.

Herein, color fields exist spaced apart from each other on the auxiliary color selection body, having the same brightness and same color, for example 4 such color fields exist. If they are different in the acquired image, this difference is used for brightness correction or brightness gradient correction.

It is preferred that subsequently, i.e., following correction of the brightness gradient, the color fields are read out.

For image acquisition, the dental object, i.e., the tooth, residual limb or gingiva to be acquired or the tooth restoration part, is brought into spatial proximity to the auxiliary color selection body. It is preferred that this is adjacent on at least two sides to the above-mentioned objects to be recorded.

Based on the acquired image, the color of the dental object, e.g. the tooth color, the residual limb color or the gingiva color, is determined in a subsequent step.

The method according to the invention preferentially includes recognition or at least spatial assignment of a location in the image where the dental object, i.e. the tooth, the tooth stump, the gingiva or the tooth restoration should be located.

In the following, it is to be understood that for the sake of simplicity the term tooth will herein be used without any limitation.

Initially, a starting point or a small region in the image is determined relative to at least one reference feature, in particular several reference features. Such a starting point, for example, may be an intersection of connecting lines of the reference features in the image. This will be marked. The starting point or the small region of the image that includes the starting point is extended to its outer limits depending on a difference in brightness up to an end region.

This is done until a dental object is recognized in the image. The image can also be an image of an image sequence.

It is particularly favorable for a starting point or a small region (24) in the image to be determined relative to the reference features, and an end region to be segmented within the starting point or the small region (24) as a function of the image information. The color will subsequently be determined for each of the segments created in this way.

When segmenting, it is particularly advantageous if the end region is iteratively segmented within a given neighboring area, taking into account the neighboring pixels.

Selected segments of the end region can be tested to determine which colors of the color fields are most similar to them.

It is advantageous if the auxiliary color selection body is automatically recognized by image analyzing, especially while making reference to at least one reference feature. In this respect, reference features, such as black circles on the color selection auxiliary body, can be used and can also be used for the above-mentioned intersection determination.

Subsequently, transformation into a reference space is performed based on color fields on the color selection auxiliary body, i.e. a color adjustment according to the gray balance, according to the type of gray chart, but within the tooth color space or the color space of the dental object. It is to be understood that herein, the term grey chart is not to be understood as being an actual grey chart, but as a normalization, such as it is typically realized with the help of a grey chart. Such an example is the Munsell neutral gray scales which will improve color communication. Munsell neutral color charts can be used for instrumental calibration, imaging testing or as reflection standards.

In any case, the result of the transformation is normalized and the normalized result is compared to a virtual library that contains either data of key teeth or other dental objects or data of restoration parts or combinations thereof.

A particular advantage of the suitably selected reference features is that they allow automatic recognition of their position. The reference features have a fairly well recognizable shape and, for example, are available as a high-contrast, especially as black circles at the outer limits or outer edges of the auxiliary color selection body.

It is also possible to save the shape and size of the reference features in advance and thus to correct any misalignment or focusing errors. In particular, the reference features are designed to be distinguishable from other circular elements which may appear as an image, i.e. stochastically distributed similar graphic entities such as nostrils.

The reference features are typically formed as surface areas, but can also be dots. They have well-defined individual features such as size, shape, brightness, orientation and so on.

The color selection aid can also be held against one or more adjacent teeth of a dental restoration to be fabricated. An L-shape is particularly suitable for this purpose.

The color fields on the auxiliary color selection body are preferably tooth colors, according to any system. They are arranged on the inside of the auxiliary color selection body, to reduce the weight of any color gradient or brightness gradient due to the short distance from the tooth.

Due to the brightness correction and color correction with the measures described herein, and due to the comparison made in the transformed color space, an inexpensive camera is also suitable to achieve very good comparison results. Accordingly, a smartphone or tablet is also suitable for the desired image acquisition, wherein the processed image is then stored in a corresponding application.

The invention provides for a system consisting of a color selection aid and a method for determining dental colors. The auxiliary color selection body preferably has an essentially U-shaped or L-shaped or ring-shaped structure.

The color selection areas may include color shades used in the dental field, which match the colors and shades of patients' natural teeth. Such colors are provided by shade guide systems in the dental field by which dental materials are matched to provide the dental restoration that matches the patient's tooth color as close as possible. Many dental materials are based off the Vita Shade Guide color system which includes 16 or 17 or more shades and bleach shades as well.

Color perception is more accurate and has fewer metamerism effects when color corrected lighting is used to evaluate the three components: hue, chroma, and value. Hue is a family or group of wavelengths that have a similar appearance. Chroma is the level of saturation of any particular hue. The value is the level of whiteness or darkness.

Shade perception and color determination is a field of study defined by mathematics. Color interpretation is often defined scientifically in a mathematical 3-D format. The format can be plotted as seen in Munsell's color sphere.

Each color is a point in space represented by three components on X, Y, and Z planes and given the identification of L*a*b*, which has been defined by the International Lighting Commission (Commission Internationale de l'Eclairage; CIE). The distance between any two colors in 3-D space is defined as Delta E. When the difference in Delta E is large enough, the eyes can perceive a difference.

Methods and systems used in the dental field include US 20060177792, U.S. Pat. Nos. 10,076,388, 6,345,984, 9,775,491 B2, US 2011212420, US 20130060532, US 2013158958, US 20170319293 and U.S. Pat. No. 7,717,708, which are hereby incorporated by reference in their entirety.

BRIEF DESCRIPTION OF THE DRAWINGS

Further advantages, details and features will arise from the following description of an exemplary embodiment of the invention while reference is made to the drawing, wherein.

DETAILED DESCRIPTION

Figure 1:
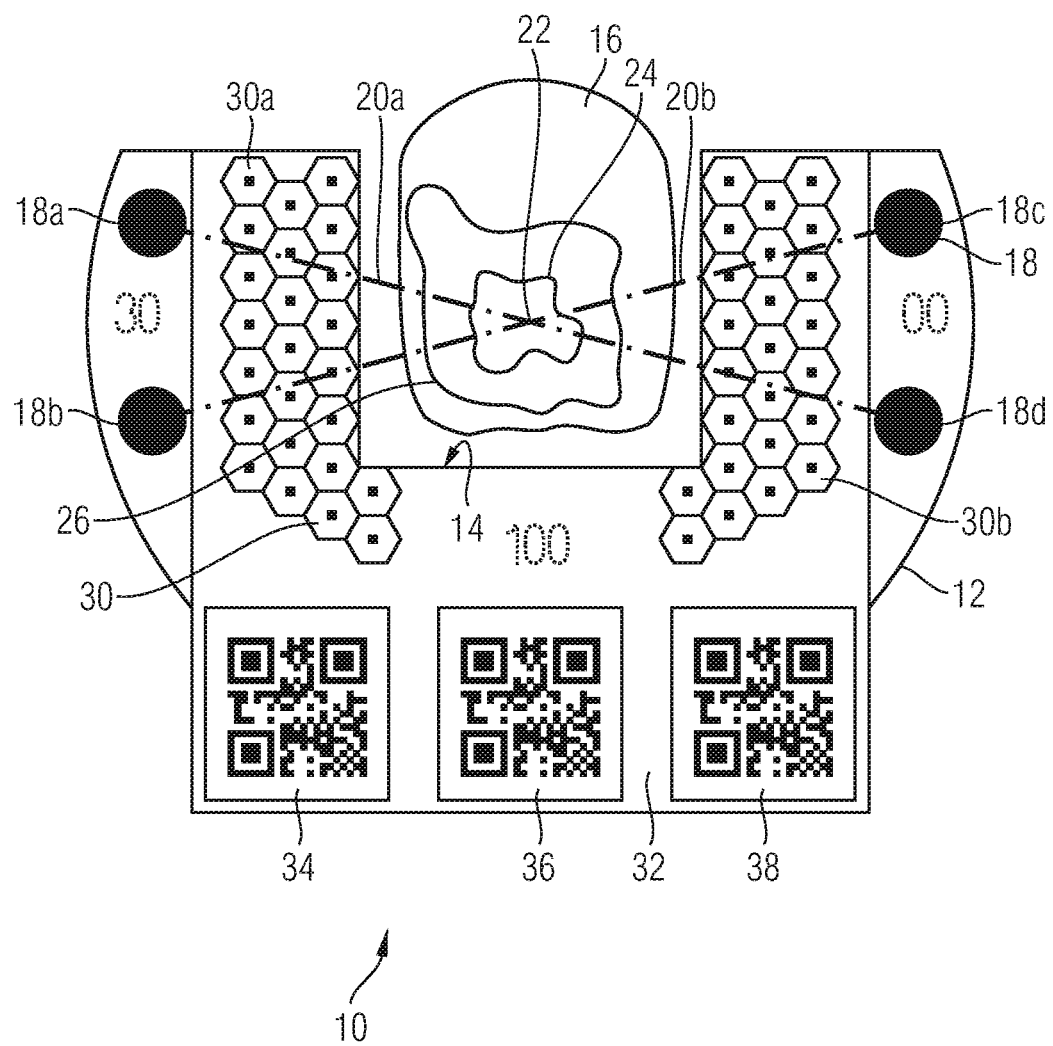
FIG. 1 is a schematic view of an auxiliary color selection body according to the invention represented while being applied to a tooth.

FIG. 1 shows an auxiliary color selection body 10, which has a U-shaped basic structure.

The auxiliary color selection body 10 comprises outer edges 12 and inner edges 14. The inner edges 14 have a width suitable for surrounding a tooth 16. The inner width is slightly larger than the width of a tooth, artificial or natural, and in the example has a width of 1 cm, but is not limited to this width. Typically, the opening in the auxiliary color selection body 10 is large enough to fit a natural tooth, tooth stump or gingiva, which teeth typically range in length and widths depending on age, gender, and size of person. Such ranges include length and widths of teeth being in the range of 5.5-10 mm, 7-11 mm, 4-8 mm, 6.5-9 mm, and 4-12 mm. Lengths may also be as great as 16-18 mm. Accordingly, the target area will be a size in which a natural human tooth can fit.

In this case, the distance of the inner edges 14 from each other is slightly less than the height of a tooth from the gingival margin, and can be adjusted to the desired dimension.

According to the invention, an image is to be taken at the position of the auxiliary color selection body 10 above the tooth 16 shown in FIG. 1. Typically, parts of neighboring teeth appear in the image on the side of the tooth 16, which for the sake of simplicity are not shown herein.

According to the invention, the auxiliary color selection body 10 is specifically designed. It has 4 reference features, herein in the form of black circles 18a, 18b, 18c and 18d. The circles 18a to 18d are adjacent to the outer edge 12 and are diagonally connected by two dashed lines 20a and 20b, as shown in FIG. 1. The lines 20a and 20b do not exist in reality, but are only drawn for illustrative purposes to show the intersection 22 of the lines, which is a fixed relative position in relation to the reference features.

This intersection 22 represents the central center of the reference features 18 for tooth recognition. The intersection 22 is approximately located at the center of the U which is formed by the inner edges 14.

The analysis software for the image assumes for the tooth 16 to be located at this position. This is also true for the application illustrated herein.

The color of tooth 16 at that position is detected, and the software analyzes whether the neighboring pixels have the same color or at least a color very similar thereto. If this is the case, a color region 24 is formed by area extension. This is exemplified in FIG. 1, including also a larger region 26, which was created by further area extension.

Figure 2A:
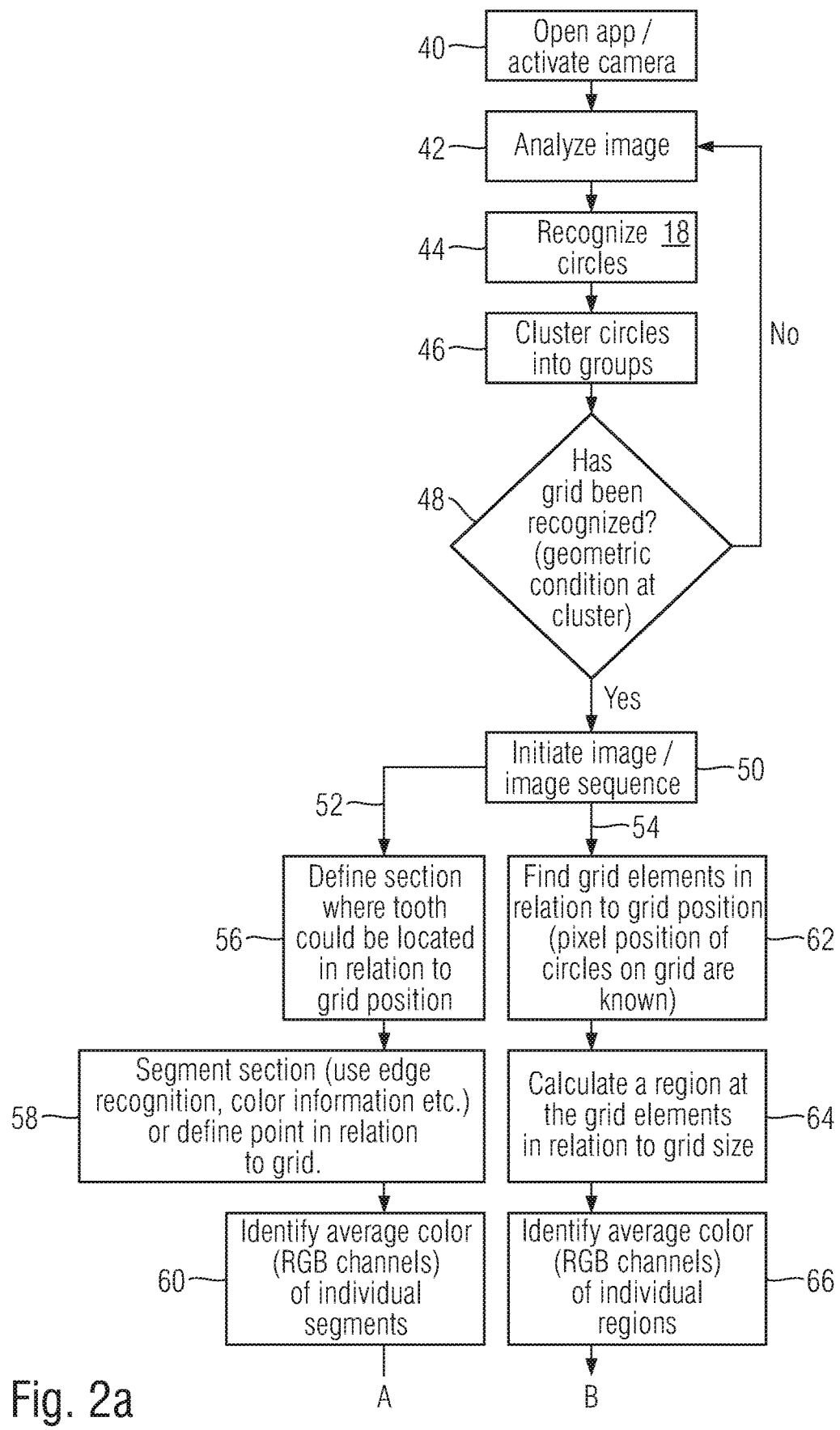
FIG. 2a is a flow chart for illustrating the method according to the invention.
Figure 2B:
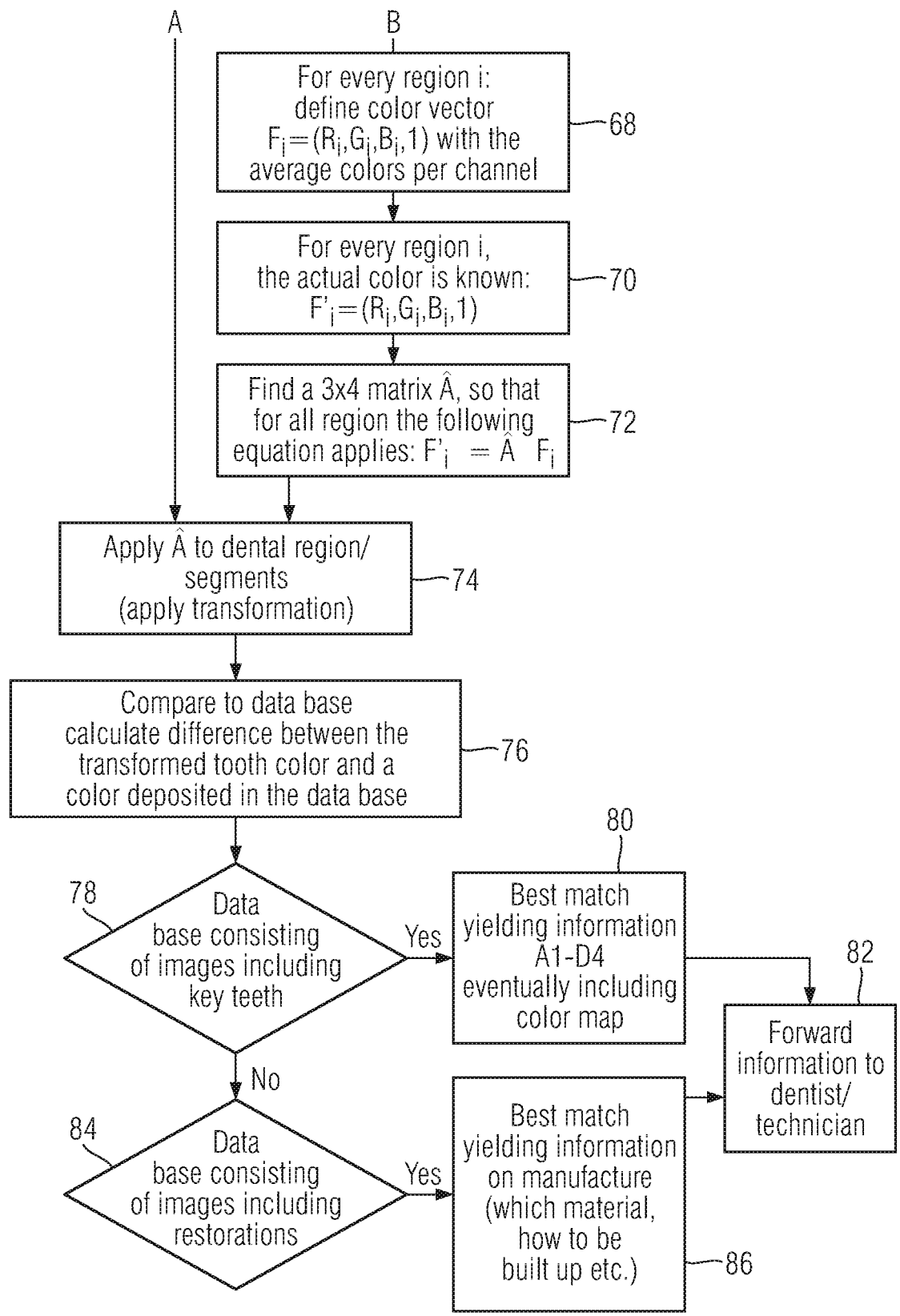
FIG. 2b is a flow chart for illustrating the method according to the invention.

This procedure is explained in detail below using FIGS. 2a and 2b.

A plurality of color fields 30 are established adjacent to the inner edges 14. Each color field having a tooth color such as A1, A3, B2 and so on.

However, there are also color fields 30a and 30b having the same color. They are reasonably spaced apart from each other and are known to the software both with regard to their shade and their arrangement.

If image acquisition shows that the colors at 30a and 30b are different, a color correction is made, and it is assumed that there is a color gradient between the respective areas of the image.

The software automatically corrects the determined color values according to the color gradient.

The same procedure is applied using a brightness gradient, which can also exist between the color fields 30a and 30b and is also to be corrected.

From FIG. 1 it may also be seen that QR code symbols 34, 36 and 38 are located in the bottom leg 32 of the U. In the example embodiment, these QR code symbols are provided with QR codes representing specified features of the auxiliary color selection body 10.

FIG. 2 shows a flow chart illustrating the method of the invention.

First, the color selection aid 10 is held or attached to tooth 16 in the manner shown in FIG. 1.

This results in what becomes apparent from FIG. 1, apart from the lines 20b and 20b and the regions 24 and 26, which, in FIG. 1, are only schematically represented.

After positioning the photo box, the camera app of the smartphone is activated in step 40 in a manner known per se, thus activating the camera and providing an image recording. This image will be analyzed with respect to both brightness and color gradient using the color fields 30a and 30b and the reference features 18.

A camera is activated and the acquired images are analyzed with respect to the reference features. This is repeated until the features have been localized/found. The last image comprising the respective reference points is for further use.

The following three steps can be performed in any order or in parallel.

Step 1: The tooth is segmented. Starting from the position of the reference points, the image information is analyzed at the point in the center thereof. This is the position where to expect the tooth. Using this information, tooth region now can be increased.

Step 2: Due to non-homogeneous illumination of the oral location, it may occur that brightness gradients are present in the image. They are corrected in the "Correct brightness gradient" step. If the image shooting situation is always the same or if no brightness gradient is visible, this step is not required. For this step, well-defined colors are analyzed on the auxiliary color selection body. The easiest way to do this is to use the same color values. If deviations between these color values occur, the colors of the image can be adjusted accordingly.

Step 3: Localization of color fields. Color fields are arranged on the auxiliary color selection body in relation to the reference features. Using the position of the reference fields, the color fields may be localized.

After the steps 1 to 3, which potentially may be parallelized, the object color (tooth color) and the reference colors (colors of the color fields) can now be read out.

A transformation is then calculated using the reference colors. This transformation is applied to the object color. Now, all colors are normalized and can be compared to colors from a virtual library and the object colors can properly be arranged within the library.

As an auxiliary color selection body, it is or can be used in a system. In some embodiments, the present disclosure may be implemented using a system having a camera, a processor, an electronic data storage unit, and a display. The camera can be a standard camera, an infrared dot-projection detector, flood illuminator camera, structured-light three-dimensional scanner, standard infrared detector, ultrasonic imaging device, Doppler detector, or any other suitable visualization system capable of capturing information related to a patient's dentition. The processor can be a single processor having one or more cores, or a plurality of processors connected by a bus, network, or other data link. The electronic data storage unit can be any form of non-transitory computer-readable storage medium suitable for storing the data produced by the system. The display can be any display suitable for displaying a digital color or grayscale image.

In some embodiments, the camera, processor, electronic data storage unit, and digital display are components of a single device. The single device may be a smartphone, tablet, laptop computer, personal digital assistant, or other computing device.

In some embodiments, the processor is in communication over a network, which could be wired or wireless, with an external processor used for performing one or more calculation steps and/or a network-attached electronic data storage unit. In some embodiments, the present disclosure makes use of cloud computing to perform one or more calculations steps remotely and/or remote storage to enable the storage of data remotely for collaborative or remote analysis. In some embodiments, the system comprises a plurality of graphical user interfaces to permit multiple users to view or analyze the same data.

In some embodiments, the system operates to provide one or more users with a visualization of a virtual dental model of a patient's teeth, which may be altered to visualize the effect of one or more dental or orthodontic alterations. In some embodiments, this allows the one or more users to visualize a "before" dentition image, i.e., the appearance of a patient's dentition prior to a dental or orthodontic procedure, and an "after" dentition image, i.e., a representation of the expected appearance of a patient's dentition after a proposed dental or orthodontic procedure.

In some embodiments, the system operates by capturing information related to a patient's dentition using a camera, creating a model of the patient's dentition on a processor, fitting a model of a proposed post-alteration dentition to the patient's dentition on the processor, coloring the model of the proposed post-alteration dentition to match an expected real post-alteration coloration, and displaying the fitted model of the proposed post-alteration dentition in place of the patient's actual dentition on a display which otherwise shows the patient's actual facial features. The information related to a patient's dentition, the model of the patient's dentition, and the model of the proposed post-alteration dentition may be stored on an electronic data storage unit. In some embodiments, the operations are performed in real-time.

In some embodiments, a user interface is configured such that a user may view the "before" dentition image and the "after" dentition image simultaneously either side-by-side or with a full or partial overlay.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A system comprising
an auxiliary color selection body (10) for determining colors of a dental object, and
a processor,
wherein the auxiliary color selection body (10) has at least one reference feature (18) disposed on the auxiliary color selection body (10) for recognition of a dental object,
wherein the auxiliary color selection body (10) has a plurality of color fields (30) arranged on the auxiliary color selection body (10),
wherein the processor records an image or an image sequence of the dental object with the auxiliary color selection body (10) being adjacent to the dental object and subsequently determines a color of the dental object based on the auxiliary color selection body (10) and/or based on the image or the image sequence, and
wherein, in relation to the at least one reference feature (18), the processor determines a starting point or a small region (24) in the image or the image sequence, and extends the starting point or the small region (24) of the image or the image sequence comprising the starting point to outer limits as a function of a difference in brightness up to an end region until a dental object is detected in the image or the image sequence.

2. The system according to claim 1,
wherein the at least one reference feature (18) comprises four or more reference features.

3. The system according to claim 1,
wherein, in relation to the at least one reference feature (18) comprising a plurality of reference features, an intersection (22) of connecting lines (20) of the reference features (18) is marked in the image.

4. The system according to claim 1,
wherein the starting point or the small region (24) is-determined in the image or in at least one image of the image sequence, in relation to the reference features,
wherein one or more end regions are segmented within the starting point or the small region (24) as a function of the image information, and
wherein the color is determined in each of the segments thus generated.

5. The system according to claim 1,
wherein the end region is iteratively segmented within a predetermined neighboring region taking into account the neighboring pixels.

6. The system according to claim 1,
wherein selected segments of the end region are tested to determine which colors of the color fields are most similar to them.

7. The system according to claim 1,
wherein the auxiliary color selection body (10) is automatically detected by image analyzing by making reference to the at least one reference feature (18).

8. The system according to claim 1,
wherein a transformation into a reference space is carried out based on color fields (30) on the auxiliary color selection body (10) comprising a color adaptation according to a grey balance according to a type of grey card, in the tooth color space or in the color space of the dental object.

9. The system according to claim 8,
wherein the result of the transformation is normalized and the normalized result is compared to a virtual library having either data of key teeth or other dental objects or data of restoration parts or combinations thereof.

10. The system according one of the claim 9,
wherein a transformation of a virtual library is performed into an absolute or standardized color space, and
wherein the comparison of color fields in the image is performed with the result of the transformation.

11. The system according to claim 1,
wherein, in determining the at least one reference feature (18) on the basis of specified features of the at least one reference feature (18) comprising one or more of shape and color, the at least one reference feature (18) is distinguished from other stochastically distributed similar graphic entities.

12. The system according to claim 11,
wherein the one or more of shape and color comprise a circular shape and black color.

13. The system according to claim 1,
wherein the at least one reference feature (18) extending two-dimensionally determines an orientation of the image with respect to a desired dental object.

14. The system according to claim 1,
wherein the auxiliary color selection body (10) is held against one or more adjacent teeth (16) of a dental restoration to be fabricated such that it surrounds the one or more adjacent teeth at least section-wise, in a U-shaped or L-shaped manner.

15. The system according to claim 1,
wherein at least two color surfaces (30A, 30B) having known color values are spatially separated from each other, and
wherein normalization is done with respect to the color across the image progression.

16. The system according to claim 15, comprising
four color surfaces having identical color values and being adjacent to the at least one reference feature (18), on which the color selection bodies (10) are attached, and
where normalization is done with respect to the color in horizontal and vertical progression.

17. The system according to claim 1,
wherein the color fields (30) are recognized within the image and a color field region is defined for each color field (30) using a color vector as an average color of the color field region.

18. The system according to claim 1,
wherein the detected color field regions are normalized in horizontal and vertical progression.

19. The system according to claim 1,
wherein the color fields (30) are provided adjacent to an inner edge (14) of the auxiliary color selection body (10).

20. A method for determining colors of a dental object comprising
providing an auxiliary color selection body (10) to determine colors of the dental object and a processor to record an image of the dental object or an image sequence of the dental object,
wherein the auxiliary color selection body (10) has a plurality of color fields (30) arranged on the auxiliary color selection body (10),
wherein the auxiliary color selection body (10) is adjacent to the dental object on at least two sides,
wherein the image recording is automatically initiated when at least one reference feature (18) is recognized,
wherein, in relation to the at least one reference feature (18), the processor determines a starting point or a small region (24) in the image or the image sequence, and extends the starting point or the small region (24) of the image or the image sequence comprising the starting point to outer limits as a function of a difference in brightness up to an end region until a dental object is detected in the image or the image sequence.

* * * * *